(12) United States Patent
McLean

(10) Patent No.: US 7,474,075 B2
(45) Date of Patent: Jan. 6, 2009

(54) DEVICES POWERED BY CONFORMABLE FUEL CELLS

(75) Inventor: Gerard Francis McLean, West Vancouver (CA)

(73) Assignee: Angstrom Power Incorporated, North Vancouver (CA)

( * ) Notice: Subject to any disclaimer, the term of this patent is extended or adjusted under 35 U.S.C. 154(b) by 7 days.

(21) Appl. No.: 11/185,755

(22) Filed: Jul. 21, 2005

(65) Prior Publication Data

US 2007/0090786 A1  Apr. 26, 2007

Related U.S. Application Data

(60) Provisional application No. 60/589,583, filed on Jul. 21, 2004.

(51) Int. Cl.
*H01M 10/46* (2006.01)
*H01M 8/04* (2006.01)
*H01M 8/12* (2006.01)
*H01M 2/00* (2006.01)
*H02J 7/60* (2006.01)

(52) U.S. Cl. .......................... 320/101; 429/26; 429/34; 429/4

(58) Field of Classification Search ................. 320/101; 429/34, 4, 26
See application file for complete search history.

(56) References Cited

U.S. PATENT DOCUMENTS

| | | | |
|---|---|---|---|
| 5,336,570 A | 8/1994 | Dodge, Jr. | |
| 5,759,712 A | 6/1998 | Hockaday | |
| 6,131,851 A | 10/2000 | Williams | |
| 6,211,643 B1 * | 4/2001 | Kagatani | 320/101 |
| 6,268,077 B1 * | 7/2001 | Kelley et al. | 429/33 |
| 6,326,097 B1 * | 12/2001 | Hockaday | 429/34 |
| 6,447,945 B1 * | 9/2002 | Streckert et al. | 429/34 |
| 6,544,400 B2 * | 4/2003 | Hockaday et al. | 205/338 |
| 6,620,542 B2 | 9/2003 | Pan | |
| 6,908,702 B2 | 6/2005 | McElroy et al. | |
| 2003/0025234 A1 * | 2/2003 | Gough et al. | 264/127 |
| 2004/0164702 A1 * | 8/2004 | Holmes | 320/101 |
| 2005/0008918 A1 * | 1/2005 | Nakakubo et al. | 429/34 |
| 2006/0127734 A1 | 6/2006 | McLean et al. | |
| 2006/0166061 A1 * | 7/2006 | Kimura et al. | 429/26 |

* cited by examiner

*Primary Examiner*—Edward Tso
*Assistant Examiner*—Alexis Boateng
(74) *Attorney, Agent, or Firm*—Schwegman, Lundberg & Woessner, P.A.

(57) ABSTRACT

Thin layers of fuel cells are provided on the housings of portable electrically-powered devices. The fuel cells provide electrical power for the devices. The fuel cell layers can follow contours of the device housings. some embodiments provide fuel plenums between a surface of the housing and a fuel cell layer. The fuel plenum may carry a fuel such as hydrogen gas to fuel cells of the fuel cell layer.

25 Claims, 10 Drawing Sheets

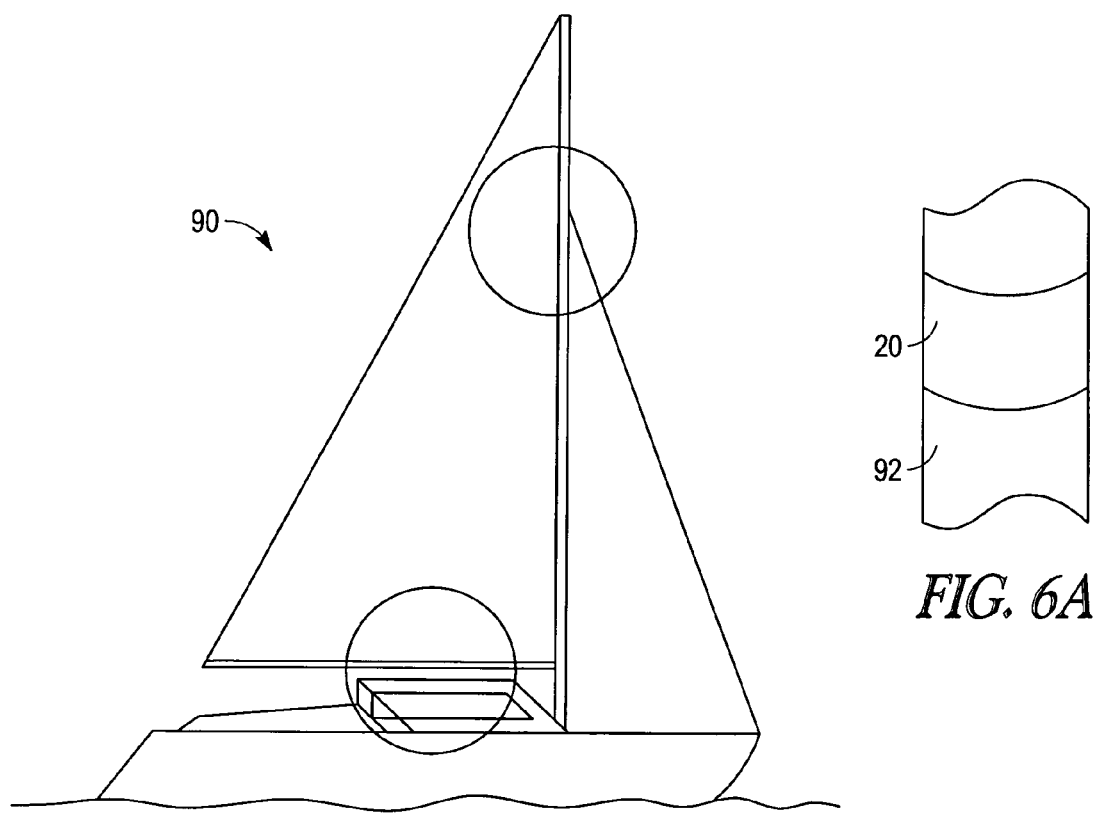
*FIG. 6*
*FIG. 6A*
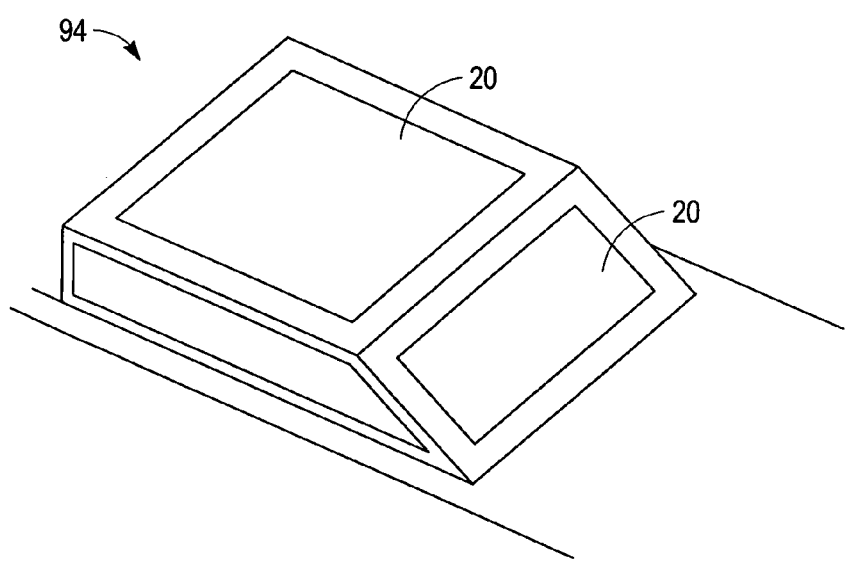
*FIG. 6B*

US 7,474,075 B2

DEVICES POWERED BY CONFORMABLE FUEL CELLS

CROSS-REFERENCE TO RELATED APPLICATION

This application claims the benefit under 35 U.S.C. §119 of U.S. patent application No. 60/589,583 filed on 21 Jul. 2004 and entitled CONFORMABLE FUEL CELLS, which is hereby incorporated by reference herein.

TECHNICAL FIELD

The invention relates to fuel cells, and particularly to devices which include fuel cells to provide electrical power.

BACKGROUND

Fuel cells can convert suitable hydrogen or hydrocarbon fuels directly into electrical power. As such, fuel cells have promise as a source of clean energy. Fuel cells have been proposed as power sources for devices as diverse as automobiles, personal computers and flashlights. Fuel cells are typically arranged in stacks. A stack configuration provides a maximized volumetric power density. The fuel cells in a typical stack each have a membrane electrode assembly (MEA). Flow field plates are located on either side of the MEA. The flow field plates are typically rigid. The flow field plates provide channels by way of which fuel and an oxidant are supplied to opposing sides of the MEA.

A fuel cells stack may be configured to fit in place of a battery. Some fuel cell stacks are cylindrical. Conventional designs require a device to be powered by a fuel cell stack to provide space to accommodate the fuel cell stack and its accompanying fuel storage container.

For large stationary devices, the volume requirements of conventional fuel cell stacks is relatively inconsequential. However, in portable applications, space is at a premium. In order to maximize power to the device, the active area of the stack must be large. In order to maximize operational lifetime, the volume available for fuel storage must be maximized. Current portable fuel-cell-powered devices are designed around the space required by the fuel cells and fuel storage just like their battery-powered counterparts are designed around the space required by batteries. This has typically resulted in undesirably bulky devices.

U.S. Pat. No. 6,131,851 to Williams describes vehicles which have an energy generating skin as an outer covering. The skin may be a fuel cell. U.S. Pat. No. 5,759,712 to Hockaday, describes a fuel cell stack that is wrapped around a fuel storage cylinder. U.S. Pat. No. 6,620,542 to Pan discloses a flexible substrate based fuel cell.

There exists a need for practical and convenient fuel-cell-powered devices.

SUMMARY OF INVENTION

One aspect of the invention provides a fuel cell system that can be conformed to structural aspects of a device which it powers. This aspect of the invention provides an array of fuel cells in a thin 2-dimensional layer, which is disposed on or constitutes a portion of a housing or structure of the device. Advantages of this aspect include better oxidant access and maximization of internal volume available for fuels or other system components.

Further aspects of the invention and features of specific embodiments of the invention are described below.

BRIEF DESCRIPTION OF DRAWINGS

In drawings which illustrate non-limiting embodiments of the invention.

DESCRIPTION

Figure 1:
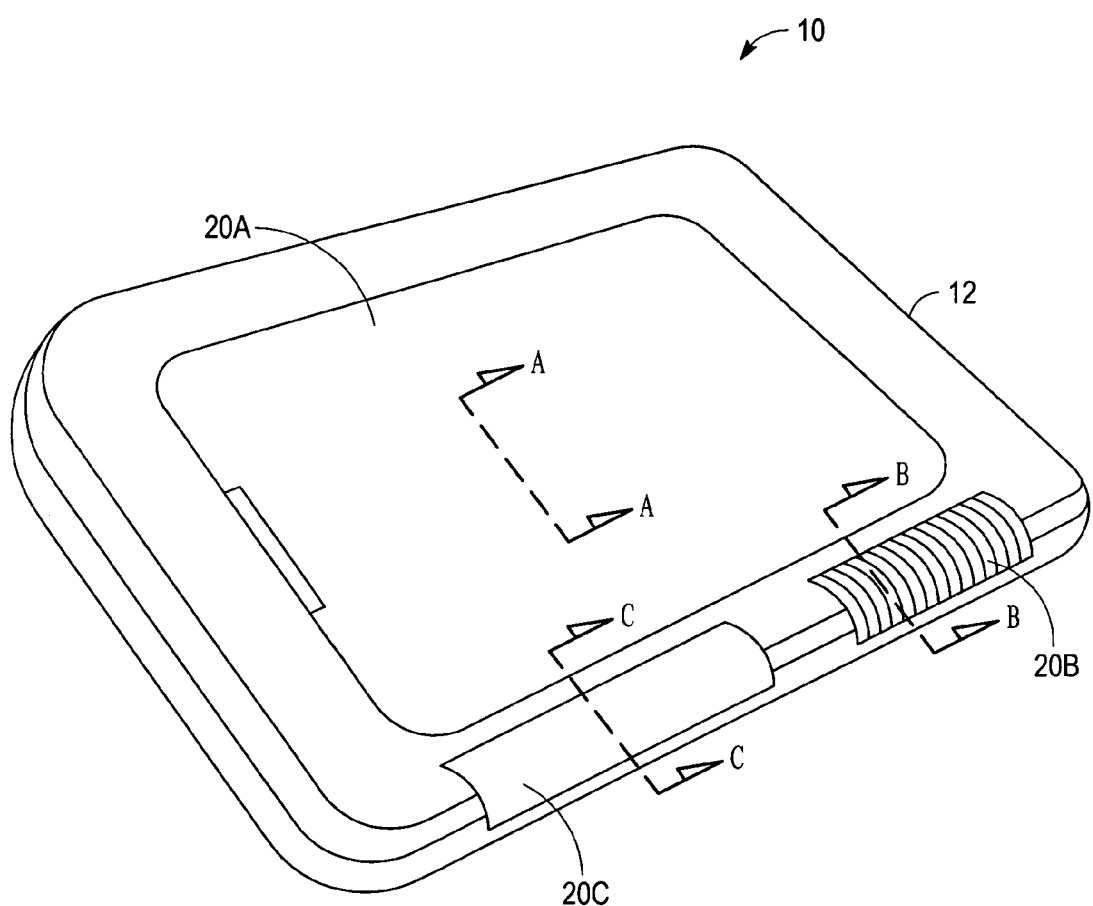
FIG. 1 shows a personal digital assistant (PDA) having fuel cells incorporated into its housing according to one embodiment of the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention exploits the fact that it is possible to make arrays of fuel cells which are thin in one dimension and spread to cover a surface in another dimension, the surface need not be planar. Such fuel cell arrays are termed "2D fuel cell arrays" herein. There are various constructions which may be used to make 2D fuel cell arrays.

A 2D fuel cell array may be made up of individual fuel cells that are arranged two-dimensionally in any of various suitable ways on an area covered by the 2D array. For example, cathode regions of individual fuel cells may be arranged to provide one or more of:

one or two or more columns of substantially parallel stripes;

shapes distributed at nodes of a two-dimensional lattice configuration (which could be a rectangular, square, triangular or hexagonal lattice, for example and which is not necessarily completely regular);

a pattern of shapes distributed in both a width and a length dimension of the area covered by the 2D array (such a pattern may be less regular than a lattice-type pattern);

or the like.

One aspect of the invention provides fuel cells that conform with the structure of the device to which they provide power. Fuel cells according to the invention could be incorporated into the structure of any device which is powered, either in part or completely, by a fuel cell system. The invention consequently reduces the intrusion of the fuel cells within the envelope of the device being powered. This permits portable electrically-powered devices to be made more compact and/or permits the volume within the housing of a portable electronic device that would otherwise be occupied by batteries or another electrical power source to be used for other purposes.

Embodiments of the invention can be constructed using rigid or flexible fuel cells, and can incorporate various types of fuel cells, including those described in U.S. Patent Application Nos. 60/567,648, Ser. No. 11/047,560 entitled ELECTROCHEMICAL CELLS HAVING CURRENT-CARRYING STRUCTURES UNDERLYING REACTION LAYERS; Ser. No. 60/567,433; and Ser. No. 11/047,557 entitled ELECTROCHEMICAL CELLS FORMED ON PLEATED SUBSTRATES and International Application No. PCT/IB03/00915 entitled APPARATUS OF HIGH POWER DENSITY FUEL CELL LAYER WITH MICRO STRUCTURED COMPONENTS, which are hereby incorporated by reference herein. Such fuel cells are examples of what is referred to herein as "thin layer fuel cells".

Thin layer fuel cells may be arranged into bipolar or unipolar arrays constructed of very thin layers. Within such an array, individual unit fuel cells may be connected in a series or series-parallel arrangement. Connecting fuel cells in such an arrangement permits electrical power to be delivered from a 2D array of fuel cells at increased voltages and reduced currents. This, in turn, permits electrical conductors having smaller cross-sectional areas to be used to collect the electrical current.

For example, in some embodiments, individual unit fuel cells each produce electrical current at a voltage of less than 1 volt (typically about 0.6 volts) and enough individual fuel cells are connected in series within the 2D array of fuel cells to produce an output voltage in excess of 6, 12, 48 or more volts. Providing output at higher voltages can be important because the electrical power produced by a 2D array of fuel cells scales approximately with the area of the array. Therefore, for output at a fixed voltage, the current being supplied when the array of fuel cells is delivering its rated output power increases rapidly with the dimensions of the fuel cell array. Large and heavy conductors would be required to carry significant amounts of electrical power at the low output voltages provided by conventional unit fuel cells.

A further feature of certain of the thin layer fuel cells described above is that the thin layer fuel cells can include current collecting conductors that are embedded within the fuel cell layers themselves. This reduces or avoids the need to provide current collecting conductors external to the thin layer fuel cells.

The thin layer fuel cells described above are particularly advantageous because, unlike fuel cell stacks which require internal plumbing to carry air and oxidant to each unit fuel cell, the thin layer fuel cells can provide arrays of unit fuel cells that do not require any special plumbing to allow air to contact the cathodes of the fuel cells. The unit fuel cells are arranged so that oxygen from ambient air present on one side of the 2D array of fuel cells can readily contact cathodes of the unit cells. As described in the above-referenced patent applications, thin layer fuel cells may comprise arrays of individual unit fuel cells that are organized in geometrical arrangements over a 2D surface. On one side of the surface, cathodes of the unit fuel cells are exposed at different locations on the surface for contact with an oxidant, such as air.

These thin layers provide design flexibility by allowing integration of the fuel cells with the structure of the device they are to power. The invention reduces interior space requirements of the fuel cells, maximizing the volume available for fuel storage or other system components.

In some embodiments of the invention, fuel cells are provided in 2D arrays which are less than 5 mm thick (possibly not including a fuel supply plenum, if present). The fuel cells can be in the range of 0.1 mm to 2mm thick, for example. Some fuel cell constructions can provide fuel cell layers that are even thinner than this. For example, some fuel cell constructions proposed in the above-noted co-pending patent application Ser. No. 11/047,557 permit the construction of fuel cells in layers as thin as, for example, 100-150 µm. Such fuel cell constructions may be used to advantage. Thin fuel cell layers can be constructed to be rigid or flexible, and can be built in a curvilinear manner. The layers can be free standing or supported. The layers can provide useful current and voltage levels, resulting in a power output that can be exploited by portable devices.

FIG. 1 shows a personal digital assistant (PDA) 10 having three groups of fuel cells 20A, 20B and 20C (collectively referred to as fuel cells 20) incorporated into a cover 12, according to an illustrative embodiment of the invention. For purposes of illustration only, each of the groups of fuel cells has a different construction. In a more typical embodiment, each group of fuel cells would be similarly constructed. Fuel cells 20 may be thin layer fuel cells, and may be supplied with fuel from a fuel storage unit within PDA 10. Fuel cells 20 are constructed to conform with the shape of portions of cover 12 of PDA 10. Fuel cells 20 may be fabricated in a layer which is attached to cover 12 of PDA 10 or may be fabricated in the material of cover 12 of PDA 10.

Fuel cells 20 could similarly be disposed on the back and/or sides of the lid of the clamshell case of a laptop computer.

Figure 1A:
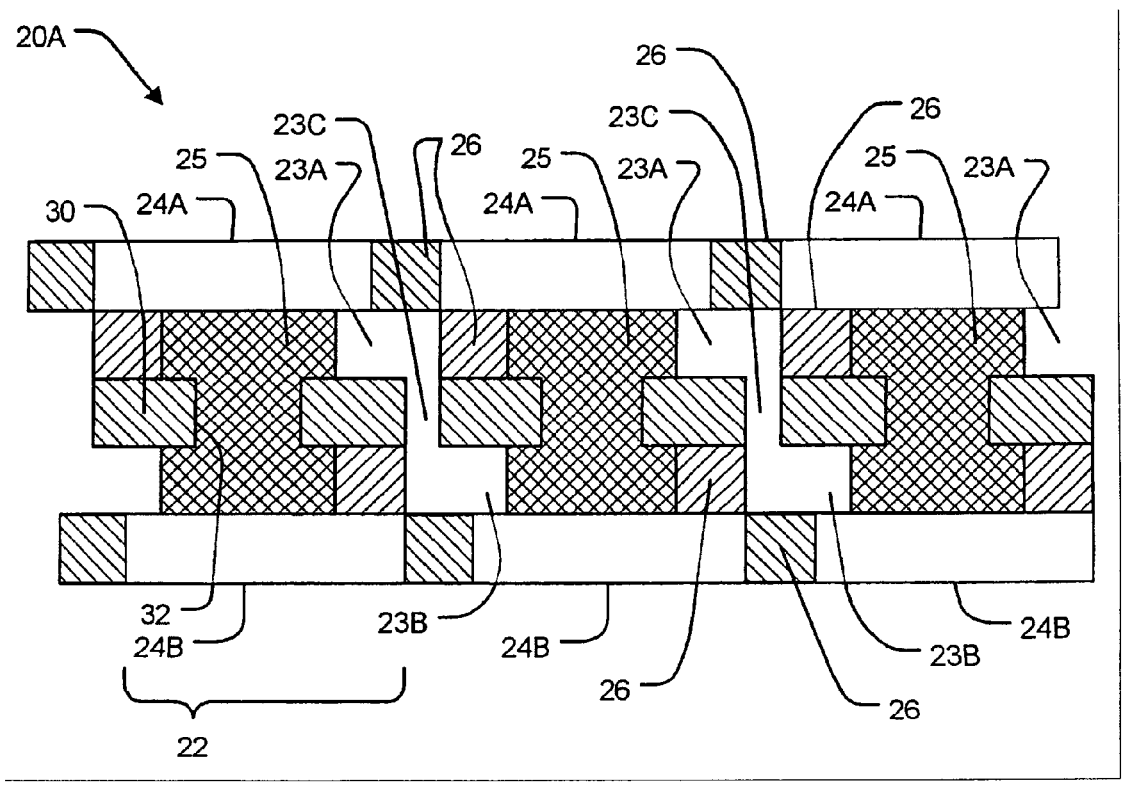
FIGS. 1a, 1b and 1c are sectional views taken along lines a-a, b-b and c-c of FIG. 1, respectively.

FIG. 1a illustrates an example structure of fuel cell layer 20A of FIG. 1. Fuel cell layer 20A is similar in construction to the fuel cell layers described in US Patent Application No. 60/567,648, 60/608,879 and Ser. No. 11/047,560 which are hereby incorporated by reference herein. Layer 20A comprises a number of electrically-interconnected unit cells 22. Each unit cell 22 comprises catalyst layers 24A and 24B on opposite sides of a proton conducting membrane 25. Proton conducting membrane 25 extends through an opening 32 in a substrate 30. Electric current carrying structures 23A and 23B underlie portions of catalyst layers 24A and 24B respectively, and are connected by an electrically conductive pathway 23C. Each unit cell 22 is separated from neighboring unit cells by electrically insulating regions 26.

Figure 1B:
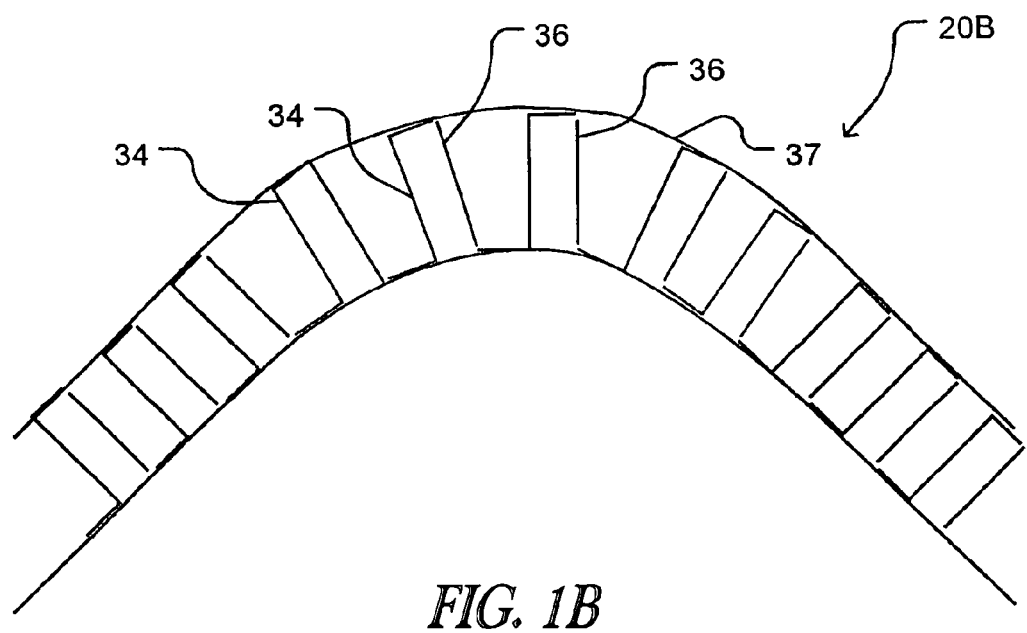
Figure 1C:
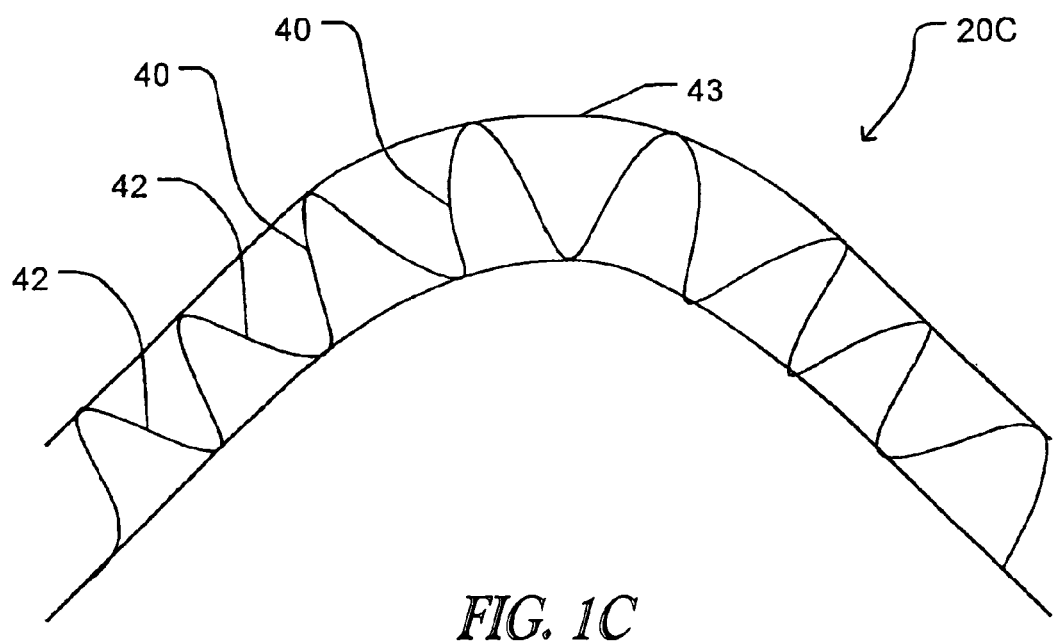

FIGS. 1b and 1c illustrate schematically other example structures of fuel cell layers 20B and 20C which may be used to provide fuel cells 20 for powering a device. Fuel cell layers 20B and 20C are similar to the fuel cell layers described in one or more of U.S. patent application Ser. Nos.:

Ser. No. 10/818,610 entitled COMPACT CHEMICAL REACTOR WITH REACTOR FRAME filed 6 Apr. 2004;

Ser. No. 10/818,611 entitled COMPACT FUEL CELL LAYER filed 6 Apr. 2004;

Ser. No. 10/818,612 entitled METHOD FOR FORMING COMPACT CHEMICAL REACTORS WITH REACTOR FRAMES filed 6 Apr. 2004;

Ser. No. 10/818,780 entitled COMPACT CHEMICAL REACTOR filed 6 Apr. 2004;

Ser. No. 10/818,826 entitled METHOD FOR MAKING COMPACT CHEMICAL REACTORS filed 6 Apr. 2004;

Ser. No. 10/818,843 entitled FUEL CELL LAYER WITH REACTOR FRAME filed 6 Apr. 2004;

PCT International application No. PCT/CA2005/000515 entitled CHEMICAL REACTORS AND METHODS FOR MAKING SAME filed on 6 Apr. 2005;

60/567,433 entitled ELECTROCHEMICAL CELLS FORMED ON PLEATED SUBSTRATES filed on 4 May, 2004; and Ser. No. 11/047,557 entitled ELECTROCHEMICAL CELLS FORMED ON PLEATED SUBSTRATES filed on 2 Feb. 2005 all of which are hereby incorporated by reference herein. Fuel cell layer 20B comprises frame sections 34 which support electrodes 36. Face seals (not shown) provide seals between frame sections 34 and electrodes 36 at the interfaces thereof. Fuel cell layer 20C comprises a continuous piece of gas barrier material 38 folded into a pleated configuration. Gas barrier material 38 has alternating proton-conducting sections 40 and electrically-conducting sections 42.

The integration of fuel cells with the housing of an electrically powered device provides the opportunity for the cathodes of the fuel cells to be in direct contact with the air in the outside environment. This reduces and/or eliminates the requirement for a plant to cause oxidant to flow through oxidant flow fields. In some embodiments of the invention, the cathodes are exposed to the environment, while the anodes and fuel plenum are located on an inner surface of the fuel cell array.

Exposed cathodes may require protection from environmental hazards. Such hazards could include, but are not limited to, excess drying, excess moisture and air pollution such as $CO_2$. Accordingly, some embodiments of the invention include means for protecting the cathodes from environmental hazards. Possible embodiments of such means include:
1. A carbon layer deposited within the gas diffusion layer that is activated to absorb contaminants.
2. A hydrophobic layer deposited on the surface of the fuel cell that renders the cathode water-repellent.
3. A porous cover over the fuel cell.

These means for protecting the cathodes may be used independently or in combination with one another.

Fuel cells 20B and 20C as shown in FIGS. 1b and 1c provide some inherent protection for the cathodes of the unit fuel cells because the cathodes are oriented at steep angles (e.g. approximately at right angles to the outer surfaces 37, 43 of the fuel cell layers 20B and 20C).

A device according to the invention may periodically, or on demand, expose the fuel cells to an operational conditioning treatment to recover performance in the event of contamination. For example, the fuel cells may be periodically connected to a load which draws a high current to heat the cathodes and thereby oxidize and/or drive off carbon monoxide or other contaminants.

Figure 2:
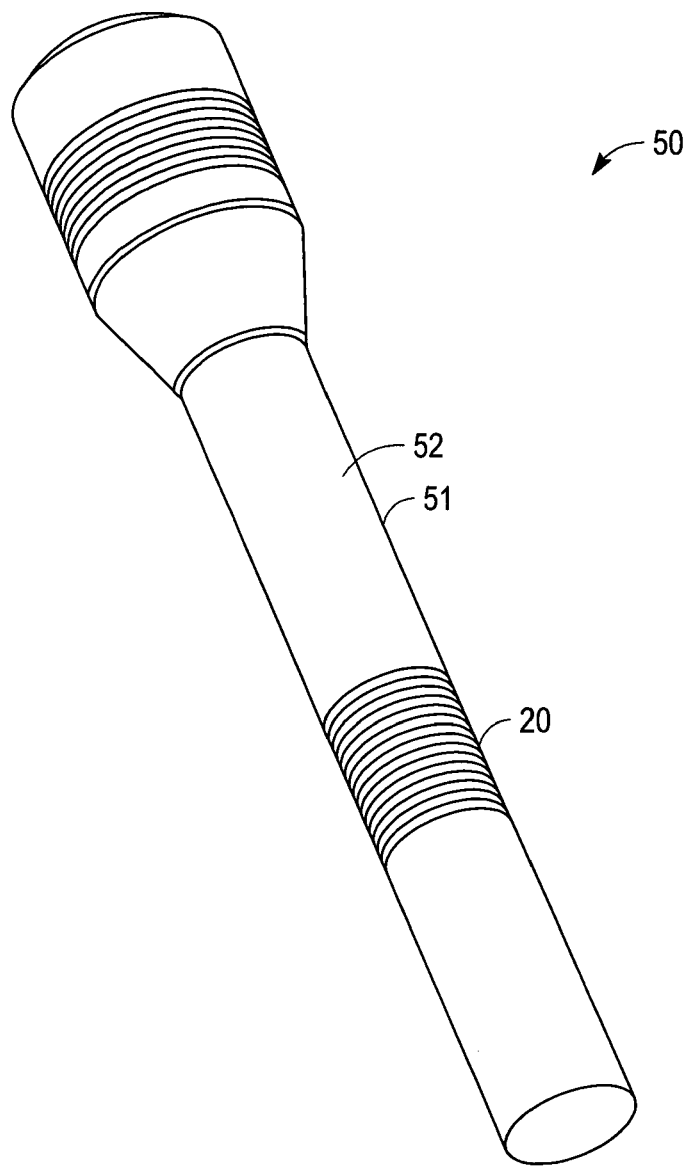
FIG. 2 shows a flashlight having fuel cells incorporated into its housing according to one embodiment of the invention.

FIG. 2 illustrates a flashlight 50 according to one embodiment of the invention. In this embodiment, fuel cells 20 are arranged in a lengthwise array on the cylindrical housing 52 which makes up the flashlight handle 51. Fuel may be stored in a fuel storage container extending throughout all or part of the length of flashlight handle 51, or in a storage container enclosed within the handle. The fuel cell cathodes could be flush with the outer surface of the flashlight handle.

Figure 2A:
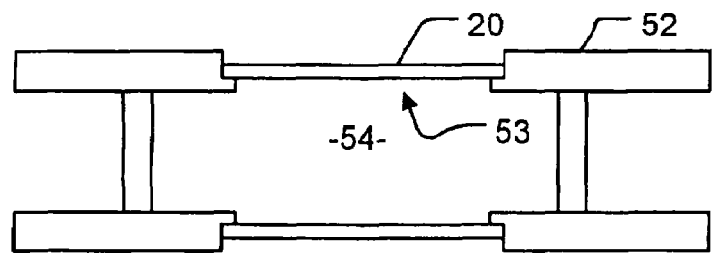
FIGS. 2A through 2H show various alternative constructions for integrating a fuel cell array into the housing of an electrically powered device.

FIGS. 2A through 2D show a number of alternative ways in which fuel cells 20 can be incorporated into the housing of an electrically operated device. In the embodiment of FIG. 2A, housing 52 is cut away in a region 53. A layer of material carrying an array of fuel cells 20 is inserted in region 53. Apart from supplying electrical power, fuel cell array 20 serves as a continuation of housing 52 across region 53. In the embodiment of FIG. 2A, the interior of the housing adjacent to fuel cell array 20 is closed off to provide a fuel storage tank 54.

Fuel from fuel cell storage tank 54 can directly reach anodes of fuel cells of fuel cell array 20.

Figure 2B:
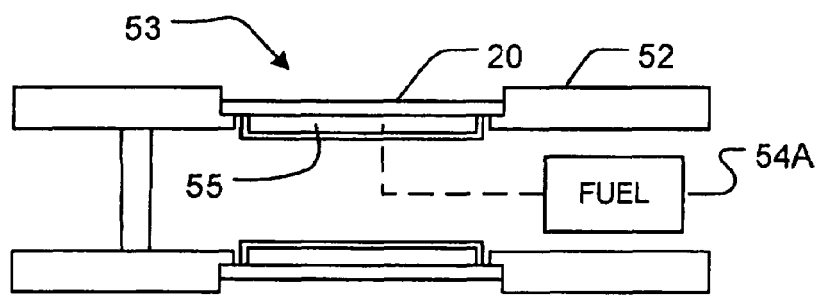
Figure 2C:
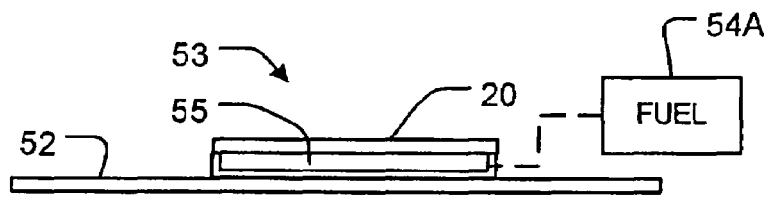

FIG. 2B shows an alternative construction wherein a fuel plenum 55 is formed on an inside of fuel cell array 20. Plenum 55 carries fuel to fuel cell array 20. The fuel is supplied from a remote storage tank 54A. As shown in FIG. 2C, a structure which integrates a thin layer fuel cell 20 and a fuel plenum 55 may be attached on the outside surface of a housing of a device by an adhesive or any other suitable attachment modality. The structure has a thickness of 5 mm or less in some embodiments.

Figure 2D:
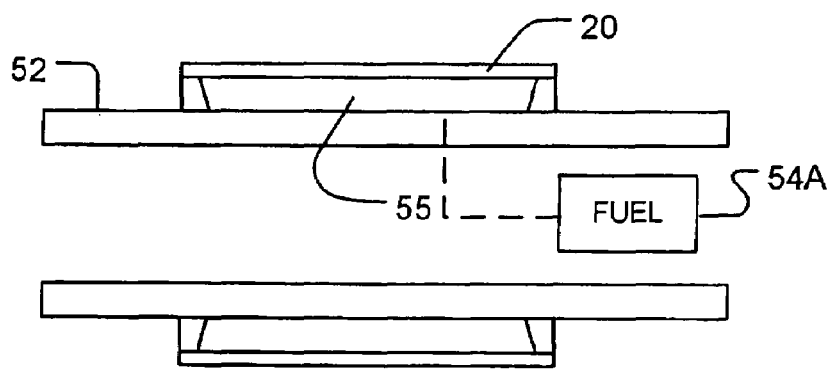

FIG. 2D shows another alternative construction wherein fuel cell array 20 is disposed on an outer surface of housing 52. Fuel cell array 20 is spaced apart from the outer surface 52A of housing 52 so to provide a plenum 55 defined between fuel cell array 20 and housing 52. Plenum 55 carries fuel to fuel cell array 20. The fuel is supplied from a remote storage tank 54A.

Figure 2E:
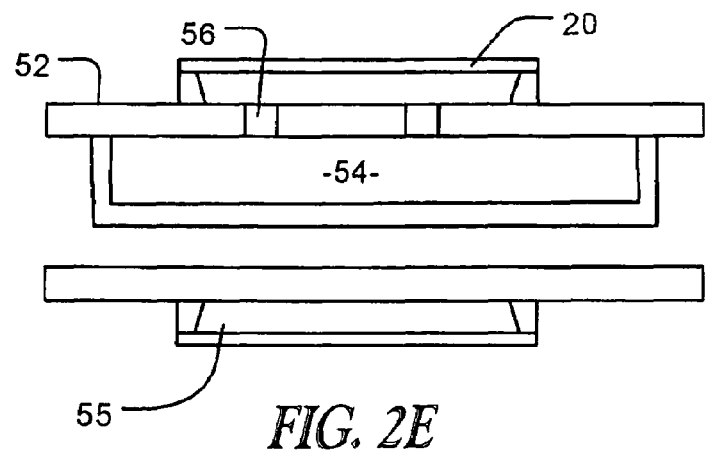

FIG. 2E shows another alternative construction which is similar to that of FIG. 2D except that housing 52 is penetrated by apertures 56 in its parts underlying fuel cell array 20 the apertures permit fuel to flow from a fuel storage tank 54 internal to housing 52 into plenum 55.

Figure 2F:
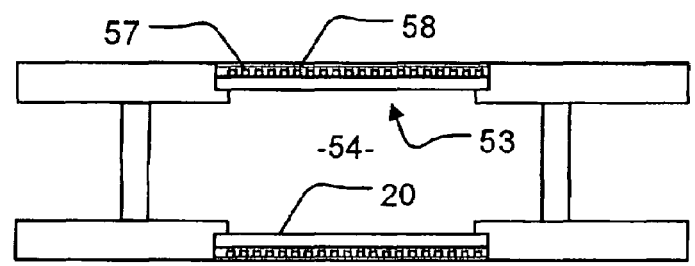

FIG. 2F illustrates another construction similar to that of FIG. 2A except that fuel cell array 20 is protected by an apertured plate 57 and a microporous membrane 58 such as a PTFE membrane of Goretex™ or a similar fabric is disposed outside of fuel cell array 20. Membrane 58 prevents water from coming into contact with the cathodes of fuel cell array 20 but permits air to diffuse in to fuel cell array 20 and permits water vapor do diffuse out away from fuel cell array 20.

Figure 2G:
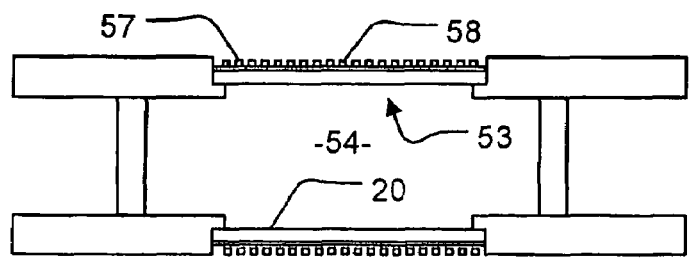

FIG. 2G shows another construction which is similar to that of FIG. 2F except that membrane 58 is located inside plate 57. In some embodiments, plate 57 is not present.

Figure 2H:
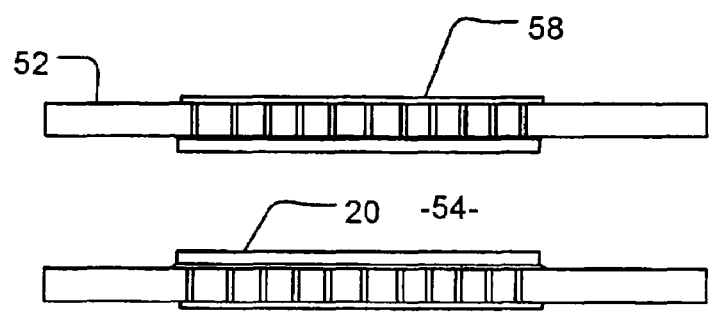

FIG. 2H shows yet another construction wherein the fuel cell array is sealed to an inside of housing 52. Housing 52 is apertured in its portions over fuel cell array 20. A breathable waterproof membrane 58 prevents water from entering housing 52 through the apertures and wetting fuel cell array 20. Air can pass through membrane 58 to reach the cathodes of fuel cells of fuel cell array 20.

In any of the above-described embodiments, the fuel may comprise hydrogen gas. The hydrogen gas may be delivered to fuel cells of array 20 at pressures above ambient pressure. The hydrogen gas may be delivered in stoichiometric quantities. Providing fuel cell arrays 20 in which the unit fuel cells are each very small reduces the likelihood that the fuel will be unevenly distributed over the unit fuel cells. In any of the above-described embodiments that include a plenum, a pattern of spacers may be provided in some embodiments to enhance the plenum's resistance to collapsing, if necessary or desirable.

The invention has particular application in providing portable electrically-powered devices of the type which can be carried around by a person and which are powered, at least in part, by thin layer fuel cells disposed to cover or make up areas of a housing of the portable electronic device. For example, the invention may be applied to any of:

personal computing devices such as tablet or laptop computers, personal digital assistants, or the like;

entertainment devices such as radios, televisions, music players, video players, cameras, video cameras, sound recorders, or the like;

communication devices such as two-way radios, cellular telephones, satellite telephones, and the like;

safety devices such as personal alarms, flashlights, beacons, warning lights, and the like;

technical equipment such as electronic testers, oscilloscopes, frequency generators, and the like; and, small appliances such as portable vacuums, portable dust blowers, and the like.

Figure 3:
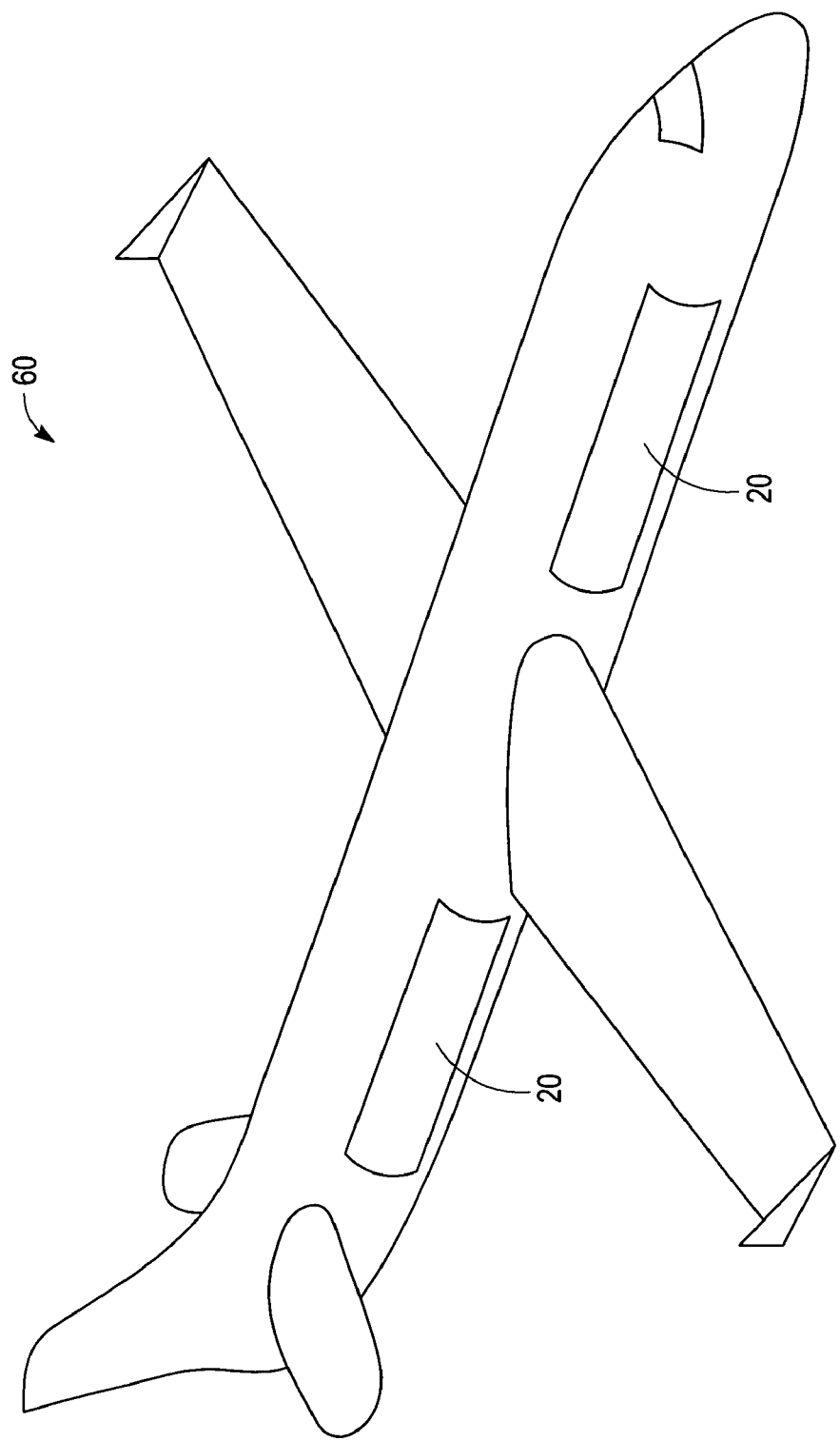
FIG. 3 shows an aircraft having fuel cells incorporated into the fuselage according to one embodiment of the invention.
Figure 3A:
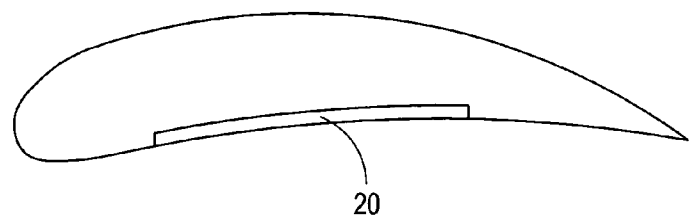
FIGS. 3a and 3b show an aircraft wing having fuel cells incorporated into the surface thereof according to one embodiment of the invention.
Figure 3B:
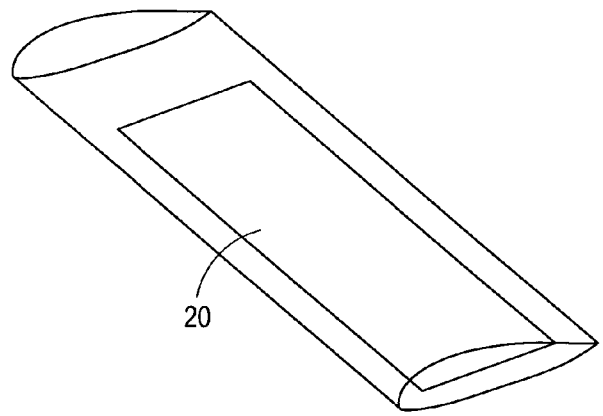

The invention may also be applied to vehicles which include electrically-powered components. For example, FIG. 3 illustrates an aircraft 60 according to one embodiment of the invention. In FIG. 3 fuel cells 20 are shown incorporated into the fuselage 62 of aircraft 60. The thin layers allow fuel cells 20 to be disposed on the fuselage wall, with little impact on the structural integrity of aircraft 60. As shown in FIGS. 3a and 3b, fuel cells 20 could additionally or alternatively be incorporated into the surfaces of wings 63 of an aircraft. Such embodiments take advantage of the high air flow that is inherently associated with aircraft wings. By using thin layer fuel cells, the weight is distributed across a large area of the wing, eliminating imbalances associated with the addition of highly concentrated point loads.

Figure 4:
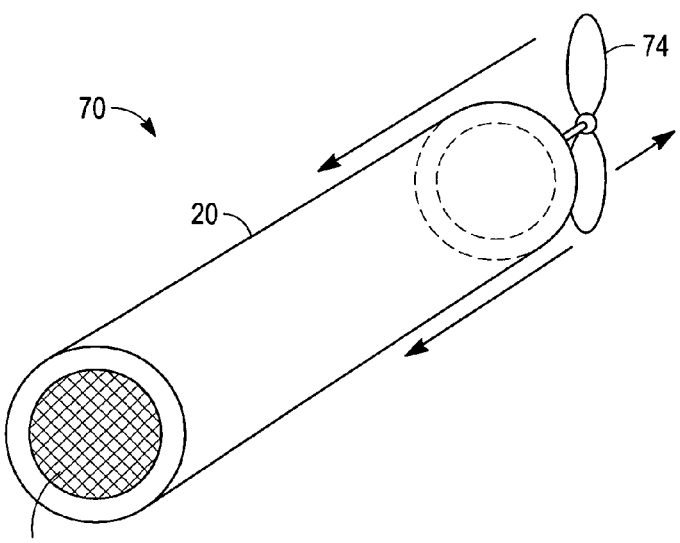
FIG. 4 shows an electric motor having fuel cells incorporated into a casing thereof according to one embodiment of the invention.

FIG. 4 illustrates an electric motor 70 according to one embodiment of the invention. In this embodiment, a cylindrical fuel cell 20 are provided on a housing 72 of electric motor 70. A fuel plenum (not shown) is located between the outer surface of housing 72 and the anodes of fuel cells 20. A fan 74 driven by electric motor 70 may optionally be provided to increase the air flow across the cathodes of the fuel cells, resulting in increased performance levels.

Figure 5:
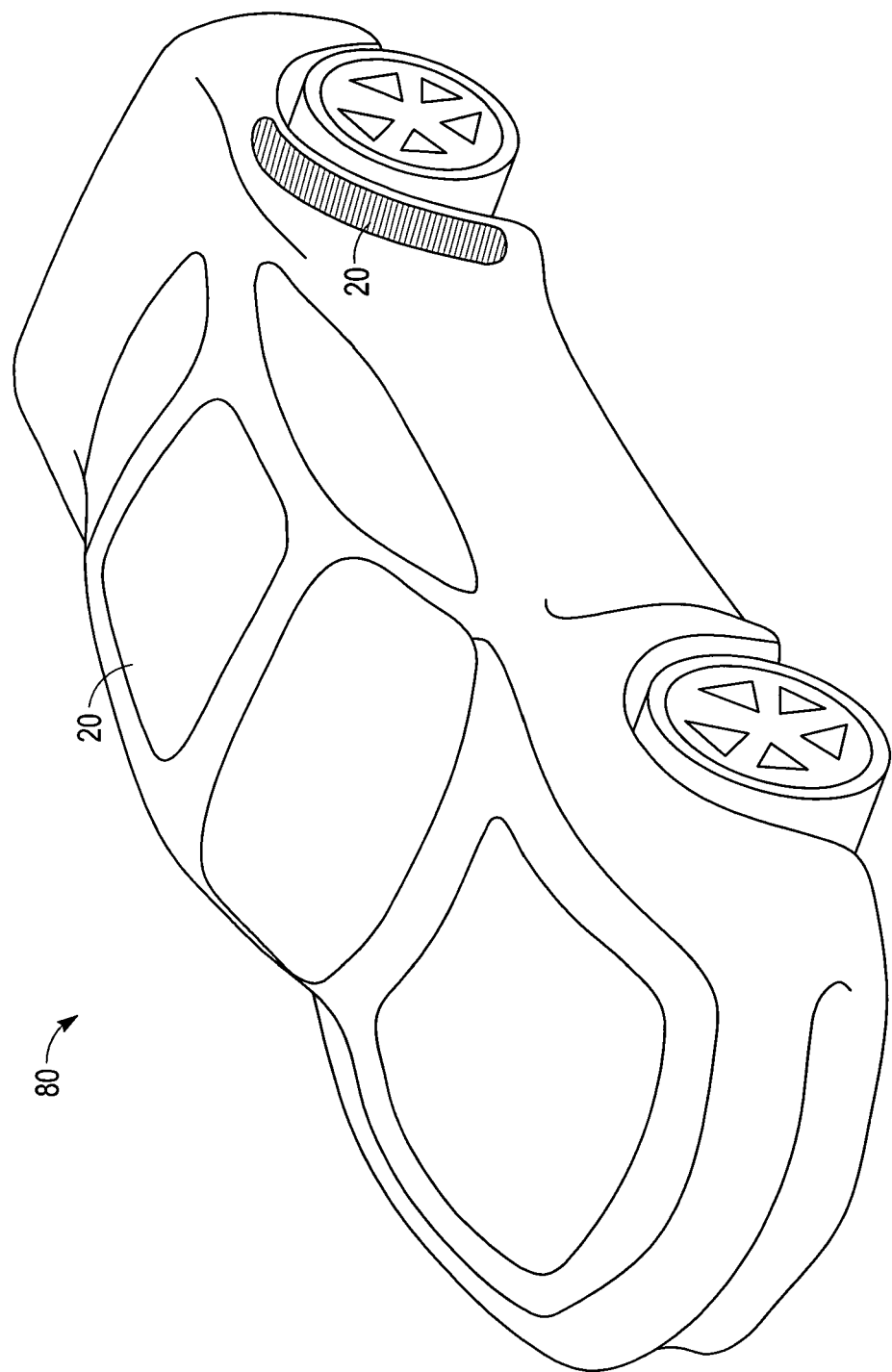
FIG. 5 shows an automobile having fuel cells incorporated into the hood, roof and fender thereof according to one embodiment of the invention; and, FIGS. 6, 6a and 6b show a sailboat having fuel cells incorporated into the mast and cabin thereof according to one embodiment of the invention.

FIG. 5 illustrates an automobile 80 according to one embodiment of the invention. FIG. 5 shows fuel cells 20 incorporated into the roof 81, hood 82, and fender 83, of automobile 80. Fuel cells could also feasibly be incorporated into the bumpers, side panels, underbody, or any other part of automobile 80.

FIG. 6 illustrates a sailboat 90 according to one embodiment of the invention. Fuel cells 20 are incorporated into the mast 92 of sailboat 90, as shown in FIG. 6a, thus capitalizing on the higher air flow velocities often present at increased distances from the water surface. Fuel cells 20 are also incorporated into the roof 93 of cabin 94, as shown in FIG. 6b. This embodiment could also be extended to motorboats, freighters, cruise ships, and the like. A hydrophobic layer or other such means of water protection for the cathodes is desirable for embodiments wherein fuel cells 20 are incorporated into watercraft and cathodes of the fuel cells are exposed.

As will be apparent to those skilled in the art in the light of the foregoing disclosure, many alterations and modifications are possible in the practice of this invention without departing from the spirit or scope thereof. For example, apparatus having various features are described above. The disclosed features may be combined with one another in any suitable manner the particular combinations described above and shown in the drawings are meant only to illustrate the invention and not to limit it. It is therefore intended that the following appended claims and claims hereafter introduced are interpreted to include all such modifications, permutations, additions and sub-combinations as are within their true spirit and scope.

What is claimed is:

1. An electrically powered device comprising:
a housing defining an envelope, the envelope having a surface;
at least one electrically-powered component located in an interior of the housing; and
a thin layer fuel cell array disposed on and supported by the housing, the fuel cell array coextensive with and substantially conforming to an area of the surface, the fuel cell array comprising a plurality of unit fuel cells each having a cathode and an anode and connected to supply electrical power to the electrically-powered component wherein the cathodes of the unit fuel cells are on an outer surface of the fuel cell array that faces outwardly and is in direct contact with ambient air on an outside of the housing and the anodes of the unit fuel cells are on an inner side of the fuel cell array toward the interior of the housing.

2. An electrically-powered device according to claim 1 comprising a fuel plenum defined between the fuel cell array and a layer of the housing.

3. An electrically-powered device according to claim 2 wherein the fuel plenum is substantially coextensive with the fuel cell array.

4. An electrically-powered device according to claim 2 wherein the fuel cell array is part of a structure which provides a fuel plenum in contact with the anodes of the unit fuel cells and the structure is affixed to the housing of the device.

5. An electrically-powered device according to claim 4 wherein the structure has a thickness of 5mn or less.

6. An electrically-powered device according to claim 1 wherein the fuel cell array comprises a plurality of unit fuel cells connected in series with one another.

7. An electrically-powered device according to claim 6 wherein an output voltage of the fuel cell array is at least about 6 volts.

8. An electrically-powered device according to claim 1 wherein the fuel cell array comprises a 2D array, the 2D array providing electrically-interconnected unit fuel cells distributed in a two-dimensional pattern.

9. An electrically-powered device according to claim 1 wherein the fuel cell array comprises current-collection conductors embedded in the fuel cell array.

10. An electrically-powered device according to claim 1 wherein cathodes of fuel cells in the fuel cell array are in contact with the air by way of a gas diffusion layer and the gas diffusion layer comprises a layer of carbon that is activated to absorb contaminants.

11. An electrically-powered device according to claim 1 wherein the outer surface of the fuel cell array is coated with a hydrophobic layer.

12. An electrically-powered device according to claim 1 comprising a porous cover covering the outer surface of the fuel cell array.

13. An electrically-powered device according to claim 1 wherein the fuel cell array is disposed on an inside surface of the housing, and the housing is apertured in a portion overlying the outer surface of the fuel cell array to permit the ambient air to reach the cathodes of the fuel cells of the fuel cell array.

14. An electrically-powered device according to claim 13 comprising a breathable waterproof membrane disposed to prevent moisture from entering the housing through the apertured portion of the housing.

15. An electrically-powered device according to claim 1 wherein the fuel cell array is disposed on a surface of the housing, and wherein the surface of the housing is not planar and the fuel cell array conforms to contours of the surface of the housing.

16. An electrically-powered device according to claim 1 wherein the device comprises a portable electronic device intended to be carried by a person and the housing comprises a case of the device.

17. An electrically-powered device according to claim 16 wherein the device comprises one or more of: a personal computing device, an entertainment device, a safety device, a piece of technical equipment and a small appliance.

18. An electrically-powered device according to claim 16 wherein the device comprises one or more of a tablet or laptop computer, a personal digital assistant, a radio, a television, a music player, a video player, a camera, a video camera, a sound recorder, a two-way radio, a cellular telephone, a satellite telephone, a personal alarm, a flashlight, a beacon, a warning light, an electronic tester, an oscilloscope, a frequency generator, a portable vacuum, and a portable dust blower.

19. An electrically-powered device according to claim 1 wherein the device is a land vehicle, a water vehicle or an aircraft.

20. An electrically-powered device according to claim 19 wherein the housing comprises a body panel of the vehicle.

21. An electrically-powered device according to claim 1 wherein the outer surface of the fuel cell array is flush with an outer surface of the housing.

22. An electrically-powered device according to claim 1 wherein the outer surface of the fuel cell array projects outwardly by no more than 5 mm from an outer surface of the housing.

23. An electrically-powered device according to claim 1 wherein the inner side of the fuel cell array is flush with an outer surface of the housing.

24. An electrically-powered device according to claim 1 wherein the inner side of the fuel cell array is flush with an inner surface of the housing.

25. An electrically-powered device according to claim 15 wherein the surface of the housing has a cylindrical portion and the fuel cell array extends around the cylindrical portion of the surface.

* * * * *

UNITED STATES PATENT AND TRADEMARK OFFICE
CERTIFICATE OF CORRECTION

PATENT NO. : 7,474,075 B2  
APPLICATION NO. : 11/185755  
DATED : January 6, 2009  
INVENTOR(S) : McLean Page 1 of 1

It is certified that error appears in the above-identified patent and that said Letters Patent is hereby corrected as shown below:

Title page, Item (57), "Abstract", line 4, delete "some" and insert -- Some --, therefor.

In column 8, line 19, in Claim 5, delete "5mn" and insert -- 5 mm --, therefor.

Signed and Sealed this

Seventh Day of April, 2009

JOHN DOLL  
*Acting Director of the United States Patent and Trademark Office*